April 28, 1942.
L. M. SEARS
2,281,012
INDUSTRIAL TRUCK
Filed Aug. 3, 1940
2 Sheets-Sheet 1
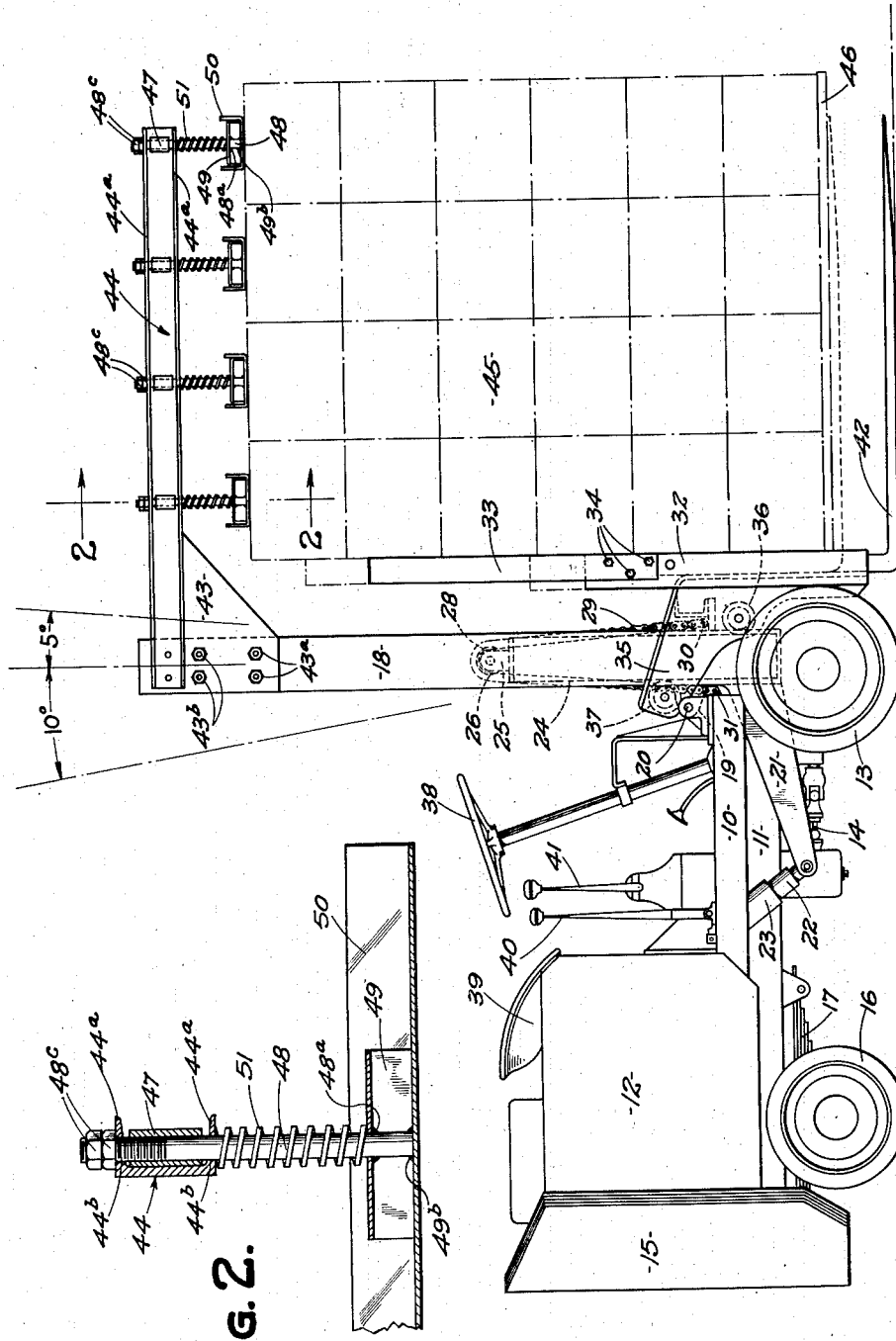
INVENTOR.
Lester M. Sears
BY
Hull, West & Chilton
ATTORNEYS.

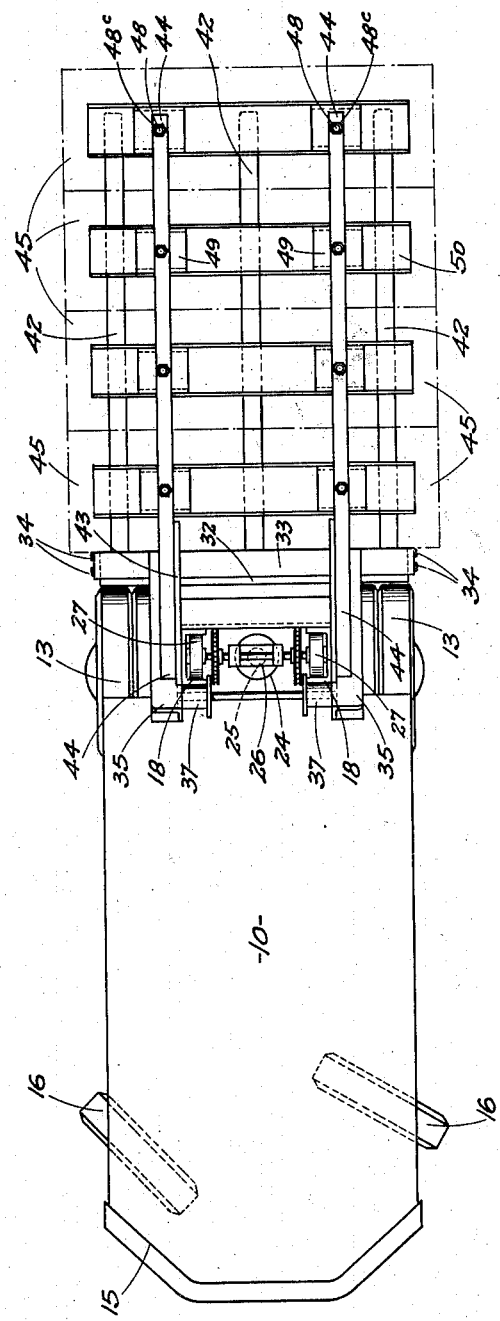

Patented Apr. 28, 1942

2,281,012

UNITED STATES PATENT OFFICE 2,281,012

INDUSTRIAL TRUCK

Lester M. Sears, Shaker Heights, Ohio, assignor to Towmotor Co., Cleveland, Ohio, a copartnership consisting of Lester M. Sears, Ruth P. Sears, and Mary Ann Sears, all of Shaker Heights, Ohio, and Anna L. Sears, Cleveland, Ohio Application August 3, 1940, Serial No. 350,587

8 Claims. (Cl. 214—66)

This invention relates to industrial trucks, and has for its general object to provide such trucks with means for enabling them to transport safely a considerable number of superposed containers, without liability to dislodgment of the same through transit of the trucks over uneven surfaces.

Further and more limited objects of the invention are to provide a simple but effective construction for accomplishing the foregoing more general object.

The embodiment of my invention disclosed herein is particularly applicable to and adapted for use in the transportation of orange boxes or crates and is illustrated in the accompanying drawings, wherein Fig. 1 represents a side elevation of an industrial truck having my invention incorporated therewith; Fig. 2 an enlarged detail in section corresponding to the line 2—2 of Fig. 1 and looking in the direction of the arrows; and Fig. 3 is a plan view of the apparatus shown in Fig. 1, the structure and mechanism which are mounted upon the frame at the rear of the mast or boom being omitted.

Describing by reference characters the various parts illustrated herein, 10 denotes part of the body framework of an industrial truck, the said framework also comprising side members 11, there being a hood or housing 12 for an internal combustion motor (not shown) by which the truck is propelled by means of the driving wheels 13, a portion of the drive shaft being indicated at 14. The engine and its housing are located at the rear of the truck. 15 denotes a heavy protecting guard at the rear of the truck for the radiator (not shown); this guard also constitutes a counterweight for the load carrier and the load thereon. Beneath the rear end of the truck are the steering wheels 16, and rear springs 17 are provided for supporting the weight of the rear end of the truck.

The truck disclosed herein is of the type wherein hydraulic means are employed for tilting the mast and for raising the load. The mast comprises two upright side members 18, preferably of channeled construction, and each is provided with a lug 19, whereby it is pivotally supported by a shaft 20 supported by and above the frame and extending transversely thereof. Each side member is provided with an arm 21 rigid therewith and extending rearwardly therefrom, the rear end of each arm being pivotally connected with a piston rod 22 projecting from a hydraulic cylinder 23.

Interposed between the mast uprights 18 is a hydraulic hoisting cylinder 24, the piston rod 25 of which is provided at its upper end with a cross head 26, the outer ends of which are provided with rollers 27 cooperating with the flanges of the upright channel members 18 to guide the cross head in its movements. Adjacent to each upright, the cross head is provided with a sheave 28 over which extends a chain 29 having its lower front end secured to a suitable anchorage 30 forming part of the movable carriage or load carrier. The opposite and rear end of each chain is secured to a fixed portion of the frame, as indicated at 31.

The carriage or load carrier comprises a vertically extending back portion 32 having cheek pieces 35 which extend upwardly and then rearwardly behind the mast, being provided with rollers 36 and 37 adapted to engage the front and rear flanges respectively of the upright channel members 18. A removable rack 33 secured to the back portion 32 as by bolts 34 serves as an extension for the back portion 32 and in this way the upper tiers of boxes or crates 45 are prevented from shifting laterally when the mast is tilted rearwardly. The truck is provided with the usual steering wheel 38 connected by suitable means (not shown) with the wheels 16; the truck is also provided with the usual seat 39 and control levers 40 and 41.

The carriage or load carrier comprises, in addition to the side members 32, a load carrier platform 42 which may take the form of forks.

With the exception of the removable rack extension 33, the construction thus far described is such as is ordinarily employed in trucks with which I am familiar and in its details forms no part of my invention herein.

For the purpose of enabling a considerable number of superposed containers to be held against displacement during their transportation, I have provided the truck with the following removable attachments in addition to the rack extension 33: 43 denotes gusset plates, each of which is removably secured to the upper end of each of the upright side members by means of bolts 43ª and bolts 43ᵇ. Rigidly secured to each gusset plate is an arm 44, which projects at right angles from the upright member to which its supporting gusset plate is attached and which extends substantially parallel with the load carrier therebelow, being of a length preferably substantially equal to the length of the load carrier. As shown herein, the arms 44 and the load carrier are of such length and are spaced a sufficient distance apart to enable six horizontal tiers of orange boxes or crates to be stacked therebetween, each tier consisting of four boxes or crates extending transversely of the load carrier and of the arms. Where the load carrier is of forked construction, it is preferable to support the bottom tier of boxes or crates upon a wooden pallet 46 placed upon the load carrier. Where each tier consists of four boxes or crates, the arms 44 will be provided with a corresponding number of clamps, each adapted to engage the top of a box or crate immediately therebeneath. The construction of each of these clamps and the manner of mounting and supporting the same from the arms 44 will now be described.

Each arm 44 is provided with suitably spaced guide sleeves 47 interposed between the flanges 44ᵃ thereof and aligned with openings 44ᵇ in the said flanges. Extending through the bores of the sleeves 47 and the said openings are plunger rods 48, each plunger rod extending through the central portion of a pressure block 49, preferably in the form of a short inverted channel, and being secured to the web thereof, as by welding, indicated at 48ᵃ. Each pressure block is fitted within a channeled clamping member 50 extending transversely of the platform and of the supporting arms 44 and extending beyond the arms 44 and being preferably somewhat less in length than the length of the boxes or crates therebeneath. The bottom of each plunger rod is also secured to the web of the channeled members 50, being preferably welded thereto, as indicated at 49ᵇ. Surrounding each of the rods 48 and interposed between the bottom flange of each arm and the web of the pressure block 49 therebeneath is a spring 51; and each plunger rod is provided, above the upper flange of the arm 44 through which it extends, with nuts 48ᶜ whereby the tension of the springs 51 may be adjusted, when necessary.

With the parts constructed and arranged as described, it is believed that the operation will be readily understood. The orange crates or boxes are stacked upon the load carrier when the latter is in the lowered position indicated in full lines in Fig. 1, the distance between the load carrier, when in its lowered position, and the bottoms of the clamping members 50 being such as to enable the six horizontal tiers of boxes or crates to be loaded thereon, without interference by the clamping members with the boxes or crates in the uppermost tier. A full load of boxes or crates having been applied to the load carrier, the latter is raised by means of the hydraulic cylinder 24 to approximately the position shown in the dot-and-dash lines in Fig. 1, at which time the channeled clamping members will have been brought into yielding engagement with the tops of the boxes or crates in the uppermost tier, under sufficient pressure to retain the boxes or crates in position while being transported over uneven surfaces. For the purpose of facilitating such transportation, the mast is then tilted rearwardly approximately 10°, as indicated on Fig. 1; and, due to this rearward tilting action and to the use of the clamping means employed, the entire load of boxes or crates may be transported safely, without injury to the contents of the same and without liability to dislodgment of any of the boxes or crates. It will be evident that the clamping means disclosed herein may be used with a less number of horizontal tiers of boxes or crates than shown in the drawings hereof, due to the range of vertical movement of the load carrier along the side members of the mast.

From the foregoing, it will be seen that I have provided for an industrial truck having a mast or boom and a vertically movable load carrier, simple and efficient means for accomplishing the objects of my invention.

Having thus described my invention, what I claim is:

1. The combination, with a truck, of a mast carried by said truck, a load carrier projecting forwardly from said mast, means for raising and lowering the same along the said mast, an arm rigid with said mast and projecting forwardly therefrom above and substantially parallel with the said load carrier, and a plurality of yieldingly supported clamping members carried by said arm and adapted to be brought into clamping engagement with articles upon the load carrier when the latter is moved upwardly along the mast.

2. The combination, with a truck, of a mast carried by said truck and comprising a pair of vertically extending side members, a load carrier projecting forwardly from said side members, means for raising and lowering the same along the said side members, an arm carried by each of said side members and projecting forwardly therefrom above and substantially parallel with the said load carrier, and a plurality of yieldingly supported clamping members carried by said arms and adapted to be brought into clamping engagement with articles upon the load carrier when the latter is moved upwardly along the side members of said mast.

3. The combination, with a truck, of a mast carried by said truck and comprising a pair of vertically extending side members, a load carrier, means for raising and lowering the same along the said side members, an arm secured to and projecting from each of the said upright members above and substantially parallel with the load carrier, one or more transversely extending clamping members each yieldingly supported by both of the said arms and each adapted to be brought into clamping engagement with an article on the load carrier therebelow when the said load carrier is elevated along the side members of the said mast.

4. The combination, with a truck, of a mast carried by said truck and comprising a pair of substantially vertical side members, a load carrier having a forwardly projecting load-receiving portion and movable along the side members of the mast and means for so moving the said carrier, an arm secured to the upper portion of each of the said side members and extending forwardly above the said load carrier, a plurality of vertically movable plunger rods carried by one of said arms and being spaced apart along said arm from the mast outwardly, and a plurality of similarly arranged and spaced vertically movable rods carried by the other of said arms, transversely extending clamping members secured to the bottoms of corresponding transversely arranged rods on the two arms, and a spring surrounding each of said rods and interposed between the arm through which said rod extends and the transversely extending clamping member to which the said rod is connected.

5. The combination, with a truck, of a mast carried by said truck, a load carrier having a forwardly projecting load-receiving portion and vertically movable along the said mast and means for so moving the said carrier, an arm secured to the said mast and extending forwardly above the said load carrier, a plurality of vertically movable plunger rods carried by said arm and being spaced apart along said arm from the mast outwardly, transversely extending clamping members secured to the bottoms of the rods on the said arm, and a spring surrounding each of said rods and interposed between the arm through which said rod extends and the transversely extending clamping member to which the said rod is connected.

6. The combination, with a truck, of a mast carried by said truck, a load carrier having a forwardly projecting load-receiving portion and vertically movable along the said mast and means for so moving the said carrier, an arm secured to said mast and extending forwardly above the said load carrier, a plurality of vertically movable plunger rods carried by said arm and being spaced apart along the said arm from the mast outwardly, a pressure block to which the bottom of each rod is connected, a spring surrounding each rod and interposed between the pressure block and the arm through which the said rod extends, and transverse clamping members engaged by the said pressure blocks.

7. The combination, with a truck, of a mast carried by said truck and comprising a pair of substantially vertical side members, a load carrier having a forwardly projecting load-receiving portion and vertically movable along the side members of said mast and means for so moving the said carrier, an arm secured to the upper portion of each of the said upright side members and extending forwardly above the said load carrier, a plurality of vertically movable plunger rods carried by each of said arms and being spaced apart along said arms from the mast outwardly, the rods on both of said arms being similarly arranged and spaced with reference to said mast, a pressure block to which the bottom of each rod is connected, a spring surrounding each rod and interposed between the pressure block and the arm through which the said rod extends, and transverse clamping members engaged by the pressure blocks on correspondingly spaced rods on the two arms.

8. In the combination recited in claim 6, each pressure block being in the form of an inverted channel through which a rod extends and each transverse member being in the form of a channel within which the pressure block is received and to which the lower end of the rod is connected which extends through the pressure block.

LESTER M. SEARS.